US008317622B2

(12) United States Patent
Gura et al.

(10) Patent No.: US 8,317,622 B2
(45) Date of Patent: Nov. 27, 2012

(54) WAGERING GAME ESTABLISHMENT DATA IMPORT/EXPORT ARCHITECTURE

(75) Inventors: Damon E. Gura, Chicago, IL (US); Budyanto Himawan, Schaumburg, IL (US); Mahesh Lakshmanaperumal, Des-Plaines, IL (US); Krishnakumar Meluveettil, Naperville, IL (US); Scott H. Schulhof, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/060,630

(22) PCT Filed: Sep. 7, 2009

(86) PCT No.: PCT/US2009/056147

§ 371 (c)(1),
(2), (4) Date: Feb. 24, 2011

(87) PCT Pub. No.: WO2010/028322

PCT Pub. Date: Mar. 11, 2010

(65) Prior Publication Data

US 2011/0159966 A1 Jun. 30, 2011

Related U.S. Application Data

(60) Provisional application No. 61/095,039, filed on Sep. 8, 2008.

(51) Int. Cl.
*G06F 17/00* (2006.01)
*G06F 19/00* (2006.01)

(52) U.S. Cl. ................. 463/42; 463/25; 463/40; 463/41

(58) Field of Classification Search ........................ None
See application file for complete search history.

(56) References Cited

U.S. PATENT DOCUMENTS

| | | | |
|---|---|---|---|
| 6,364,769 | B1 | 4/2002 | Weiss et al. |
| 6,606,708 | B1 | 8/2003 | Devine et al. |
| 6,816,904 | B1 | 11/2004 | Ludwig et al. |

(Continued)

FOREIGN PATENT DOCUMENTS

| | | |
|---|---|---|
| JP | 2005006807 | 1/2005 |

(Continued)

OTHER PUBLICATIONS

"PCT Application No. PCT/US09/56147 International Search Report", Nov. 2, 2009 , 8 pages.

*Primary Examiner* — Paul A D'Agostino
(74) *Attorney, Agent, or Firm* — DeLizio Gilliam, PLLC

(57) ABSTRACT

An architecture that employs an internal entity that controls import and export of data ("import/export controller") and an external entity that operates as a liaison ("data liaison") between the import/export controller and one or more online social communities allows online social community access in a secure manner. The import/export controller and the data liaison handle data transmissions (e.g., data feeds, data updates, etc.) between the secure entity and the one or more online social communities. The import/export controller applies rules that regulate import and export of data, and the data liaison allows the import/export controller to operate in obscurity. Funneling data transmissions through the import/export controller and the data liaison allows players to securely access an online social community from a wagering game machine while in a wagering game establishment.

24 Claims, 8 Drawing Sheets

U.S. PATENT DOCUMENTS

2004/0248645 A1 12/2004 Blackburn et al.
2006/0230428 A1 10/2006 Craig et al.
2007/0168463 A1 7/2007 Rothschild
2008/0009344 A1 1/2008 Graham et al.
2008/0020814 A1* 1/2008 Kernene .......................... 463/10
2009/0055204 A1* 2/2009 Pennington et al. .............. 705/1
2009/0055205 A1* 2/2009 Nguyen et al. .................... 705/1

FOREIGN PATENT DOCUMENTS

WO WO2010028322 3/2010

* cited by examiner

WAGERING GAME ESTABLISHMENT DATA IMPORT/EXPORT ARCHITECTURE

RELATED APPLICATIONS

This application claims the priority benefit of U.S. Provisional Application Ser. No. 61/095,039 filed Sep. 8, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to controlling import/export of data with respect to a wagering game establishment.

BACKGROUND

The popularity of online social communities has grown at an incredible rate. The fast growing popularity reflects a large population of active users. A large population of active users can be used to distribute information efficiently and quickly. Security concerns prevent or substantially limit access to online social communities, thus preventing or substantially limiting access to the utility and entertainment of social network websites.

SUMMARY

In some embodiments, a method comprises establishing a data feed between an online social community server and a server of a wagering game establishment through at least two intermediate machines; evaluating content of the data feed with a first of the intermediate machines to ensure the content conforms to security rules of the wagering game establishment; and obscuring the wagering game establishment server from the online social community server with the second of the two intermediate processes.

In some embodiments, said establishing the data feed between the online social community server and the wagering game establishment server comprises the first intermediate machine validating a request for the data feed based on the security rules of the wagering game establishment.

In some embodiments, the method further comprises the first intermediate machine spawning one or more processes to handle the data feed if validated under the security rules.

In some embodiments, said obscuring the wagering game establishment server comprises the second intermediate machine communicating with the online social community server and the first intermediate machine.

In some embodiments, said evaluating the content of the data feed comprises the first intermediate machine sampling units of the data feed for the evaluating.

In some embodiments, said establishing the data feed comprises establishing security measures for the data feed to comply with the security rules.

In some embodiments, a method comprises validating a request to establish a data feed between a wagering game machine in a wagering game establishment and a server of an online social community against data import/export rules of a wagering game establishment; establishing the data feed through a data liaison associated with the online social community and a data import/export controller of the wagering game establishment in accordance with the data import/export rules; and expurgating units of the data feed in accordance with the import/export rules while maintaining the data feed and maintaining obscurity of the wagering game machine from the online social community server.

In some embodiments, establishing the data feed comprises spawning a process that reports current wagering gaming data of a player in the wagering game establishment to the server of the online social community.

In some embodiments, the current wagering gaming data comprises one or more of current winnings, most frequently played wagering game, total wagers, and achievements awarded.

In some embodiments, establishing the data feed comprises spawning a process that bridges the data feed to a second wagering game machine at a different wagering game establishment and bridges a data feed from the second wagering game machine to the wagering game machine.

In some embodiments, one or more machine-readable media having instructions encoded therein, which, when executed by a set of one or more processors, causes the set of one or more processors to perform operations that comprise validating a request to establish a data feed between a wagering game machine in a wagering game establishment and a server of an online social community against data import/export rules of a wagering game establishment; establishing the data feed through a data liaison associated with the online social community and a data import/export controller of the wagering game establishment in accordance with the data import/export rules; and expurgating units of the data feed in accordance with the import/export rules while maintaining the data feed and maintaining obscurity of the wagering game machine from the online social community server.

In some embodiments, said operation of establishing the data feed comprises spawning a process that reports current wagering gaming data of a player in the wagering game establishment to the server of the online social community.

In some embodiments, the current wagering gaming data comprises one or more of current winnings, most frequently played wagering game, total wagers, and achievements awarded.

In some embodiments, said operation of establishing the data feed comprises spawning a process that bridges the data feed to a second wagering game machine at a different wagering game establishment and bridges a data feed from the second wagering game machine to the wagering game machine In some embodiments, an apparatus comprises a processor; a set of one or more network interfaces; and means for funneling data transmissions between a wagering game establishment and an online social community through an import/export controller that controls the data transmissions based on import/export rules for the wagering game establishment, and a data liaison associated with the online social community.

In some embodiments, the apparatus further comprises means to expurgate data units of the data transmission in accordance with the import/export rules.

In some embodiments, the apparatus further comprises means to validate requests for the data transmissions based on the import/export rules.

In some embodiments, a network comprises a first machine configured to validate a request for a data feed between a server of a wagering game establishment and a server of an online social community, and configured to ensure the data feed complies with a set of rules of the wagering game establishment; and a second machine communicatively coupled with the first machine, the second machine configured to liaise with the server of the online social community for the first machine to obscure the first machine.

In some embodiments, the first machine is obscured from the server of the online social community.

In some embodiments, the network further comprises a wagering game server communicatively coupled with the first machine and a wagering game machine communicatively coupled with the first machine, wherein the first and the second machine are configured to obscure the wagering game machine and the wagering game machine server from the server of the online social community.

BRIEF DESCRIPTION OF THE FIGURES

Embodiments of the invention are illustrated in the Figures of the accompanying drawings in which.

DESCRIPTION OF THE EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

A secure architecture can provide a wagering game establishment access to the utility and entertainment value of online social communities. An architecture that employs an internal entity that controls import and export of data ("import/export controller") and an external entity that operates as a liaison ("data liaison") between the import/export controller and one or more online social communities allows this access in a secure manner. The import/export controller and the data liaison handle data transmissions (e.g., data feeds, data updates, etc.) between the secure entity and the one or more online social communities. The import/export controller applies rules that regulate import and export of data, and the data liaison allows the import/export controller to operate in obscurity. Funneling data transmissions through the import/export controller and the data liaison allows players to securely access an online social community (e.g., an online wagering game community) from a wagering game machine while in a wagering game establishment. This secure access couples the online social community with the wagering game establishment experience without unnecessarily exposing wagering game establishment resources. Coupling the wagering game establishment with the online social community creates a symbiotic relationship between the wagering game establishment and the online social community that can enhance player experience and possibly increase user/player participation.

Figure 1:
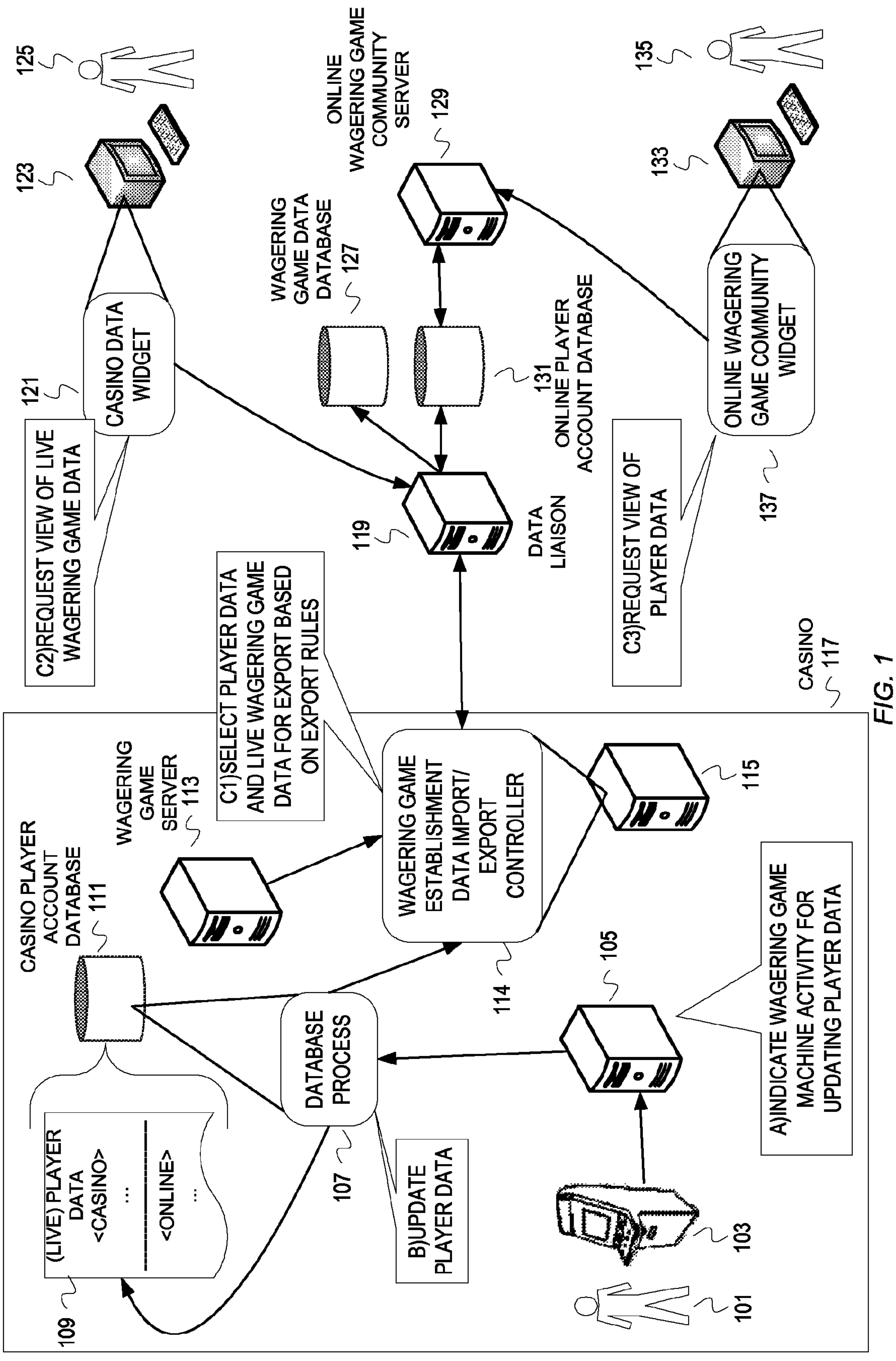
FIG. 1 depicts an example conceptual diagram of data being exported from a wagering game establishment into an online social community.

FIG. 1 depicts an example conceptual diagram of data being exported from a wagering game establishment into an online social community. A casino 117 includes a wagering game server 105, a wagering game machine 103, a server 115, a wagering game server 113, and a casino player account database 111. The casino player account database 111 hosts an entry 109 for a player 101. A database process 107 operates on the casino player account database 111.

Player activity in the casino 117 can trigger an update of player data in the casino player account database 111, which eventually affects their account in an online social community. The player 101 interacts with the wagering game machine 103. The player 101 may swipe a player card, log into his casino player account, etc. At a stage A, activity by the player 101 at the wagering game machine 103 causes the wagering game server 105 to indicate the wagering game machine activity to the database process 107. The wagering game activity indicated to the database process 107 affects the player account entry 109. At a stage B, the database process 107 updates player data in the entry 109. The entry 109 comprises player data from activity in the casino 117, and player data from an online social community (e.g., an online wagering game community). The entry 109 has been marked to indicate that the player 103 is currently active in the casino 117. The entry 109 can be marked when the player 101 registers in the hotel, swipes a player card, logs into a wagering game machine, etc. FIG. 1 depicts the marking of the entry 109 with an indication of "(LIVE)" in the entry 109.

The updated player data can be viewed external to the casino. A request that originates from an online social community or a derivative of the online social community (e.g., a widget created for and/or distributed from an online social community) can request to view or modify, thus incurring a read operation, online player data of the player 103. For example, a friend of the player 101 may request to modify reputation of the player 101, add a comment to a website of the player 101, send an in-casino instant message to the player 101, see what game the player 101 is playing in the casino 117, etc. FIG. 1 depicts a user 135 (e.g., a friend of the player 101) requesting to view the player data of the player 101 at a stage C3. The user 135 submits the request with an online wagering game community widget 137 at a client 133. The user 135 may explicitly request a view, may select an identifier for the player 101 on a friend list, etc. The online wagering game community widget 137 transmits the request to an online wagering game community server 129. The online wagering game community server 129 accesses an online player account database 131 to retrieve player data of the player 101. Although not illustrated, the online player account database hosts an entry similar to the entry 109. Embodiments may use the request to view the player data to trigger submission of a request to pull player data from a data liaison 119. Embodiments can also push updates (e.g., batch, individual, etc.) from the casino 117 to the data liaison 119. At a stage C2, a wagering game establishment data import/export controller 114, which is hosted on the server 115, can select the entry 109 in response to a request from the data liaison 119. The wagering game establishment data import/export controller 114 may receive a player data update (e.g., the entire entry 109, a compressed version of the entry 109, a delta of the entry 109, etc.) to be applied to the online player account database 131. The wagering game establishment data import/export controller transmits the player update data, which at least includes live casino player data (e.g., name of current casino, name of game, total winning this trip, winnings today, name of most frequently played wagering game, a casino reputation update, etc.) to the data liaison 119. The data liaison 119 applies the player data update to the online player account database 131.

The wagering game establishment data import/export controller 114 and the data liaison 119 have agreed upon security and communications protocols for the transfer of sensitive data from the casino 117. For instance, the wagering game establishment data import/export controller 114 and the data liaison 119 can encrypt all transmissions with keys exchanged out of band, predefined, etc. Despite the example depictions, embodiments can establish an n:n relationship between data import/export controllers and data liaisons. Regardless of the number, visibility of the data import/export controllers are limited to data liaisons, and communications with the data import/export controllers are funneled through the data liaisons. Moreover, data liaisons are not limited to particular hardware (e.g., chips, servers, etc.). A data liaison can be implemented as a virtual machine, a process, etc., encoded with a wagering game developer key or security value.

In addition, data export/import with a wagering game establishment is not limited to player data, can involve live wagering game data. It may be desirable to view current win statistics, current jackpots of various wagering games, etc. without being encumbered with inflexible security measures, such as dedicated lines. The wagering game server 113 can provide the wagering game establishment data import/export controller 114 with a continuous update of wagering game data ("live wagering game data"), such as running jackpots, recent payouts, etc. The data import/export controller 114 transmits the wagering game data to the data liaison 119. The data liaison 119 writes the wagering game data to a wagering game data database 127. Running jackpot amounts can be reported from multiple wagering game establishments over dedicated lines. An aggregation of the multiple establishment running jackpots can be supplied to a data import/export controller to transmit to a data liaison. The aggregation can indicate a ranking of wagering game establishments based on running jackpot amounts, data of last payout, etc. To view the live wagering game data, a user 125 submits a request at a client 123 via a casino data widget 121, which has been provided by the casino 117 or a trusted developer (e.g., wagering game developer). At a stage C2, the casino data widget 121 requests a view of a live wagering game data for a particular wagering game, for all progressive jackpots at a given casino, etc., to the data liaison 119. Although not necessary, access to the wagering game data database 127 can be limited to the data liaison 119. The data liaison 119 accesses the wagering game data database 127 to retrieve the appropriate live wagering game data for the casino data widget 121.

Figure 2:
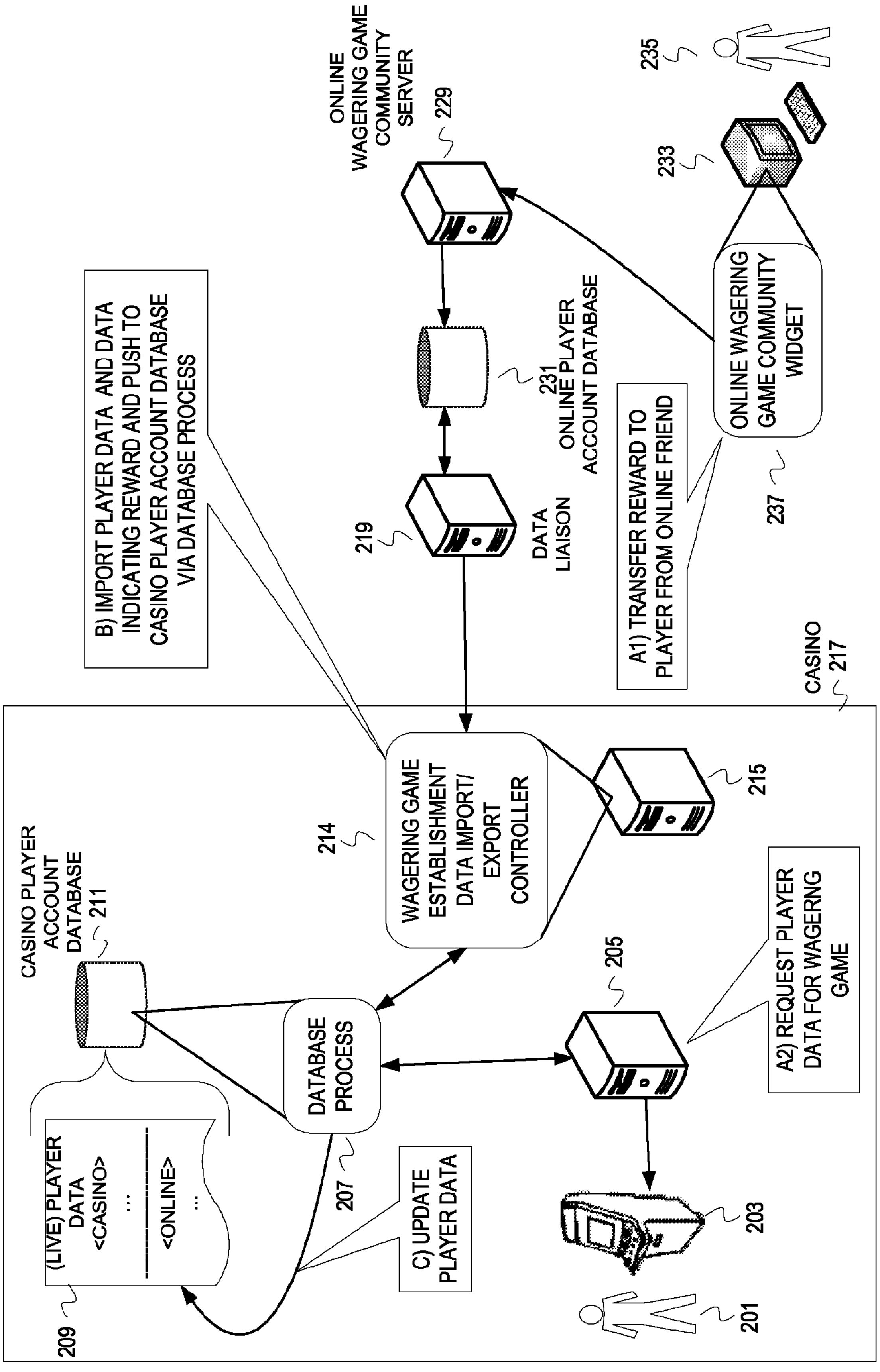
FIG. 2 depicts an example conceptual diagram of data being imported into a casino.

FIG. 2 depicts an example conceptual diagram of data being imported into a casino. A casino 217 includes a casino player account database 211, a server 215 that hosts a wagering game establishment data import/export controller 214, a wagering game server 205, and a wagering game machine 203. The casino 217 can allow importation of online player data (e.g., data that indicates any one of achievements, rewards, reputation, community credits, etc.) for various uses within the casino 217 (e.g., trade achievements for services, acquire goods with rewards, play secondary games, enhance wagering games, etc.). Importation of player data can be initiated from within the casino 217 or from outside of the casino 217.

At a stage A1, a user 235 initiates importation of player data from an online social community at a client 233. The user 235 uses an online wagering game community widget 237 to transfer a reward to an online friend, who is the player 201. FIG. 2 depicts a widget as an example. The user 235 could also modify player data (e.g., transfer the reward) with a different interface, such as a web browser. The online wagering game community widget 237 indicates the transfer of the reward from the user 235 to the user 201 to an online wagering game community server 229. The online wagering game community server 229 updates an online player account database 231 to reflect the transfer. Embodiments can propagate this update from the online player account database 231 to the casino 217 via a data liaison 219. Embodiments can also wait for a request from the casino, notify the casino 217 of the update and allow the casino 217 to dictate if and when to retrieve the updated player data, etc.

At a stage A2, the user 201 initiates importation of online player data from the wagering game machine 203 into the casino 217. When the user 201 performs an initiating action (e.g., swipes a player card, enters a player account identifier, enters biometric data, etc.), the wagering game machine 203 transmits a request for player data of the user 201 to the wagering game server 205. Embodiments can prompt the user to explicitly request online player data. Embodiments can automatically retrieve online player data. The wagering game server 205 submits the request to a database process 207, which operates on the casino player account database 211. The database process 207 retrieves player data from an entry 209 for the user 201 from the casino player account database 211. The database process 207 also submits a request for current online player data for the user 201 to the wagering game establishment data import/export controller 214. The wagering game establishment data import/export controller 214 imports the current online player data for the user 201 through the data liaison 219. The controller 214 pushes the current online player data to the casino player account database 211 via the database process 207. The entry 209, as depicted in FIG. 2, comprises casino player data and online player data, and is marked as LIVE to reflect the recent activity of the user 201 in the casino 217. The database process 207 can perform the retrieval and request in parallel, in any order, etc. The database process 207 can send the player data from the entry 209 and the imported online player data individually, can update the entry 209 with the imported online player data and then retrieve the entry 209, can merge the imported online player data and player data retrieved from the entry 209, etc. The database process 207 provides the current online player data to the wagering game server 205, which then updates the wagering game machine 203 to reflect the current online player data. For example, the display of the wagering game machine 203 now indicates the transferred reward and a popularity rating for the user 201.

Although funneling data transmissions through a data liaison external to a casino and a data import/export controller secured by/for the casino allows access to data of an online social community while obscuring highly regulated computing resources of the casino, the data can also be regulated by either of the data liaison or the data import/export controller.

Figure 3:
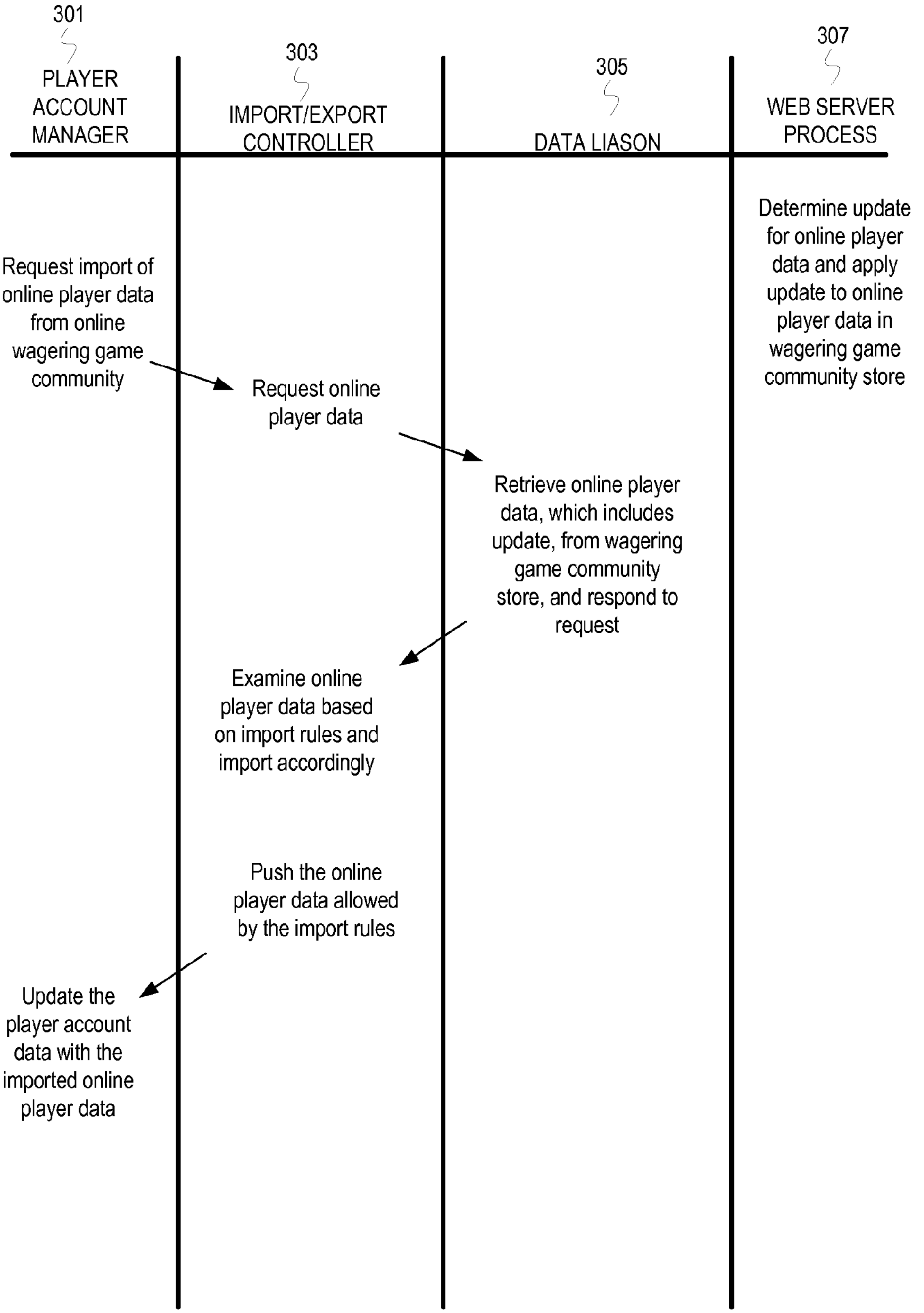
FIG. 3 depicts an example of an import/export controller regulating content of data imports.
Figure 4:
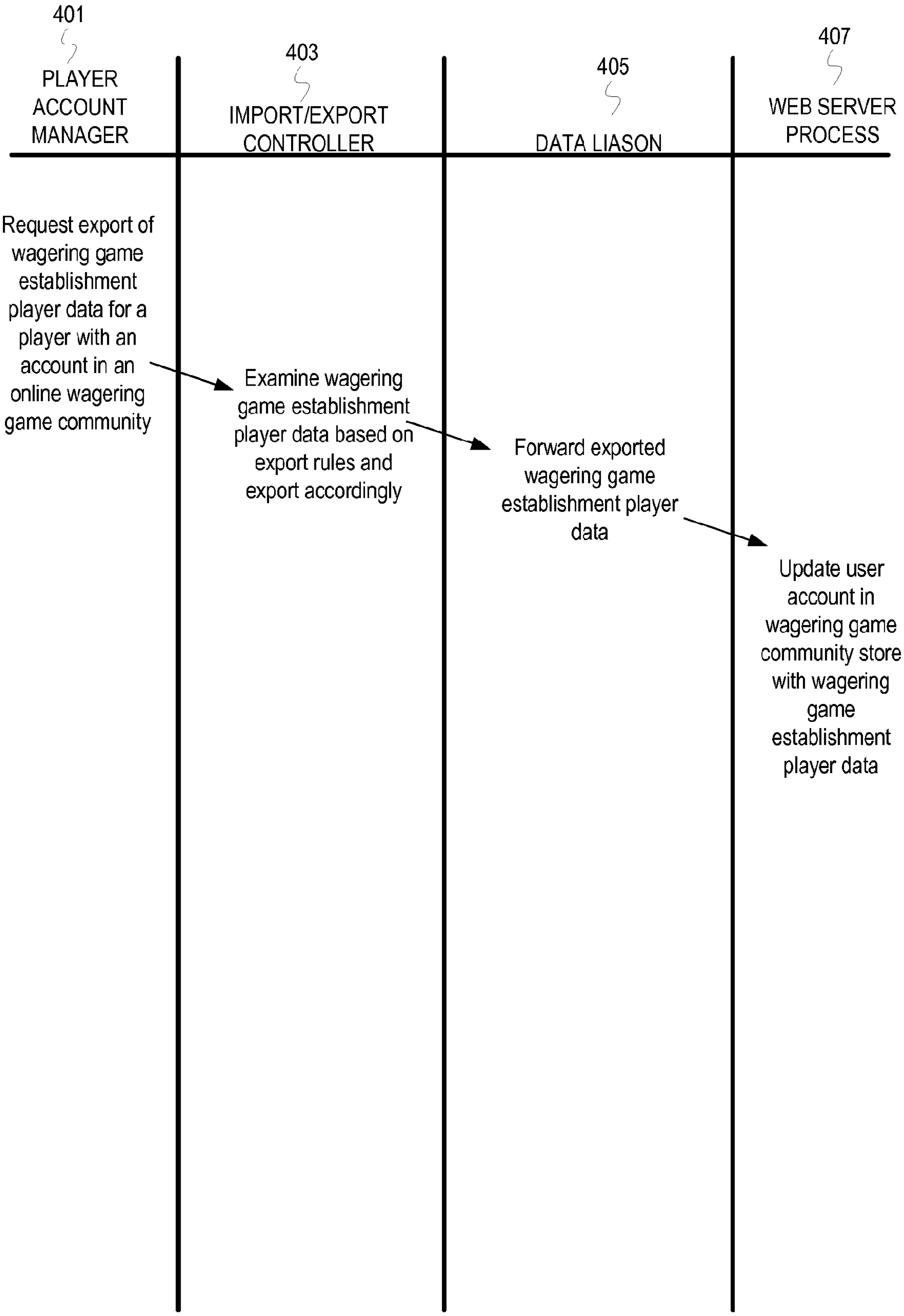
FIG. 4 depicts an example of exporting player data in accordance with rules enforced by a data import/export controller.

Although either one or both of the data import/export controller and the data liaison can regulate content of data transmissions, FIGS. 3 and 4 depict examples of the data import/export controller regulating the data transmissions. FIGS. 3 and 4 depict use of rules (e.g., business rules or logic) to regulate data transmissions. Embodiments use different techniques for regulating content of data transmissions and/or the rules can employ different techniques (e.g., heuristics, pattern searching, etc.).

FIG. 3 depicts an example of an import/export controller regulating content of data imports. At some point in time, a web server process 307 determines an update for online player data, and applies the update to the online player data in a wagering game community store (e.g., database store for an online social community). Activity in a wagering game establishment causes a player account manager 301 to request an import/export controller to import the online player data. The import/export controller 303 of the wagering game establishment requests the online player data from a data liaison 305. The data liaison 305 retrieves the online player data, which includes the update, from the wagering game community store. The data liaison 305 transmits a response with the online player data to the import/export controller 303. The import/export controller 303 examines the online player data from the data liaison 305 based on import rules. For instance, the import rules can only permit online player data of a particular format. As another example, the import rules can restrict importation to particular fields or a particular size. A wagering game establishment can also define different import rules for different jurisdictions, game developers, wagering games, etc. The import/export controller 303 imports the online player data in accordance with the rules, and pushes the imported online player data to the player account manager 301. The import/export controller 303 can inform the data liaison 305 of aspects of the online player data that violated the rules, if any. The player account manager 301 updates the player account of the wagering game establishment with the imported online player data.

FIG. 4 depicts an example of exporting player data in accordance with rules enforced by a data import/export controller. A player account manager 401 requests an import/export controller 403 to export wagering game establishment player data of a player with an account in an online wagering game community. The import/export controller 403 examines the wagering game establishment player data based on export rules. The export rules may indicate security measures to be applied to at least some of the player data, indicate at least some player data that cannot be exported, etc. In addition, the rules may be hierarchical. For instance, an export rule can restrict export of data to particular data liaisons of particular online social communities, and indicate export rules for application to respective ones of the online social communities. The import/export controller 403 exports the wagering game establishment player data in accordance with the export rules to a data liaison 405. For example, the rules can require the import/export controller 403 to expurgate (e.g., remove, scramble, etc.) a player identifier used by the wagering game establishment and wagering game establishment notes about a player, and can require the import/export controller 403 to use different levels of encryption for different aspects of the player data. The data liaison405 forwards the exported wagering game establishment player data to a web server process 407 of an online social community. The web server process 407 updates a user account in a wagering game community store with the wagering game establishment player data. If the data liaison has access to the wagering game community store (e.g., a game developer controls the data liaison and the wagering game community store), then the data liaison 405 can update the user account.

Figure 5:
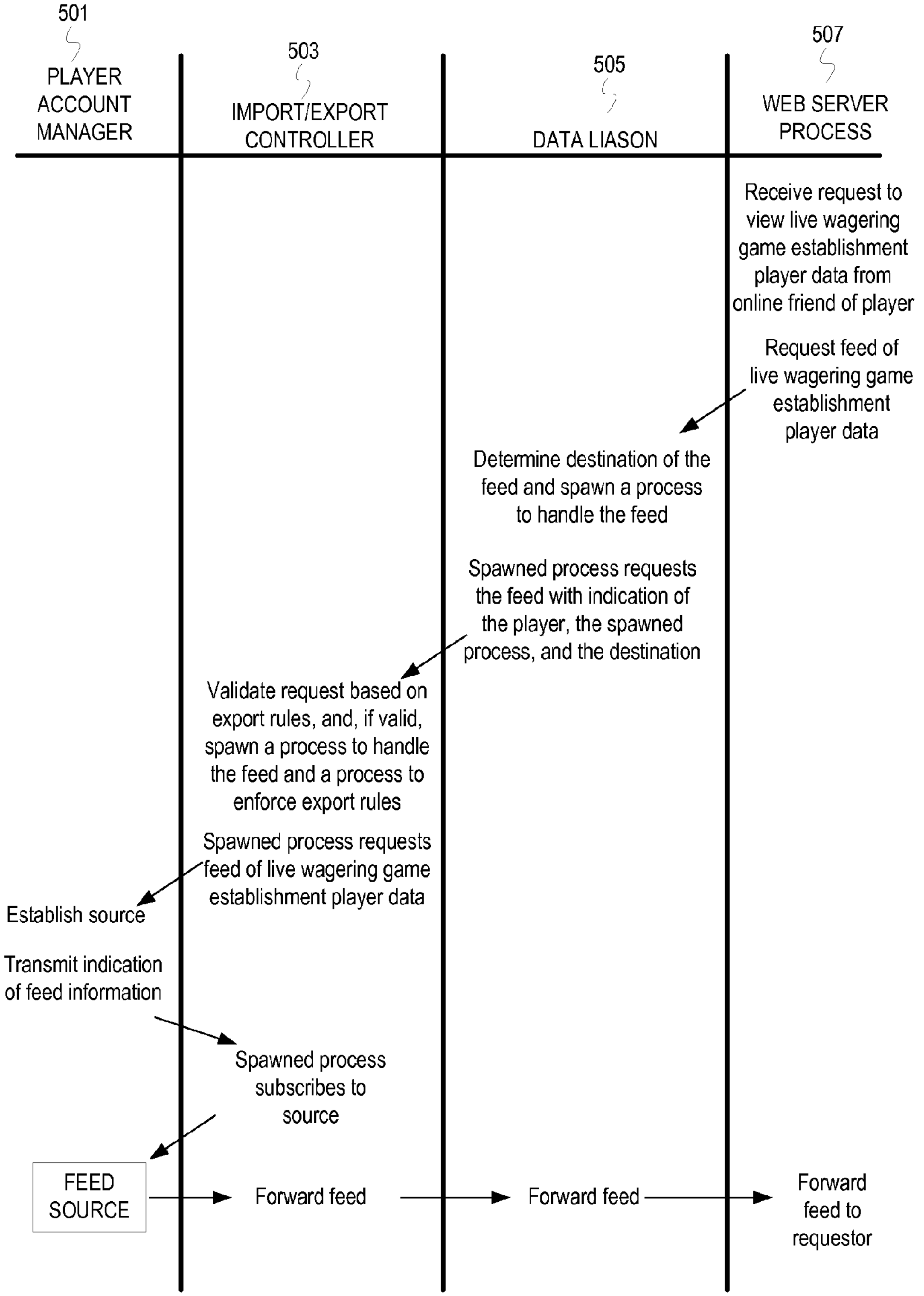
FIG. 5 depicts an example conceptual diagram of an import/export controller establishing an outgoing data feed to an online social community.
Figure 6:
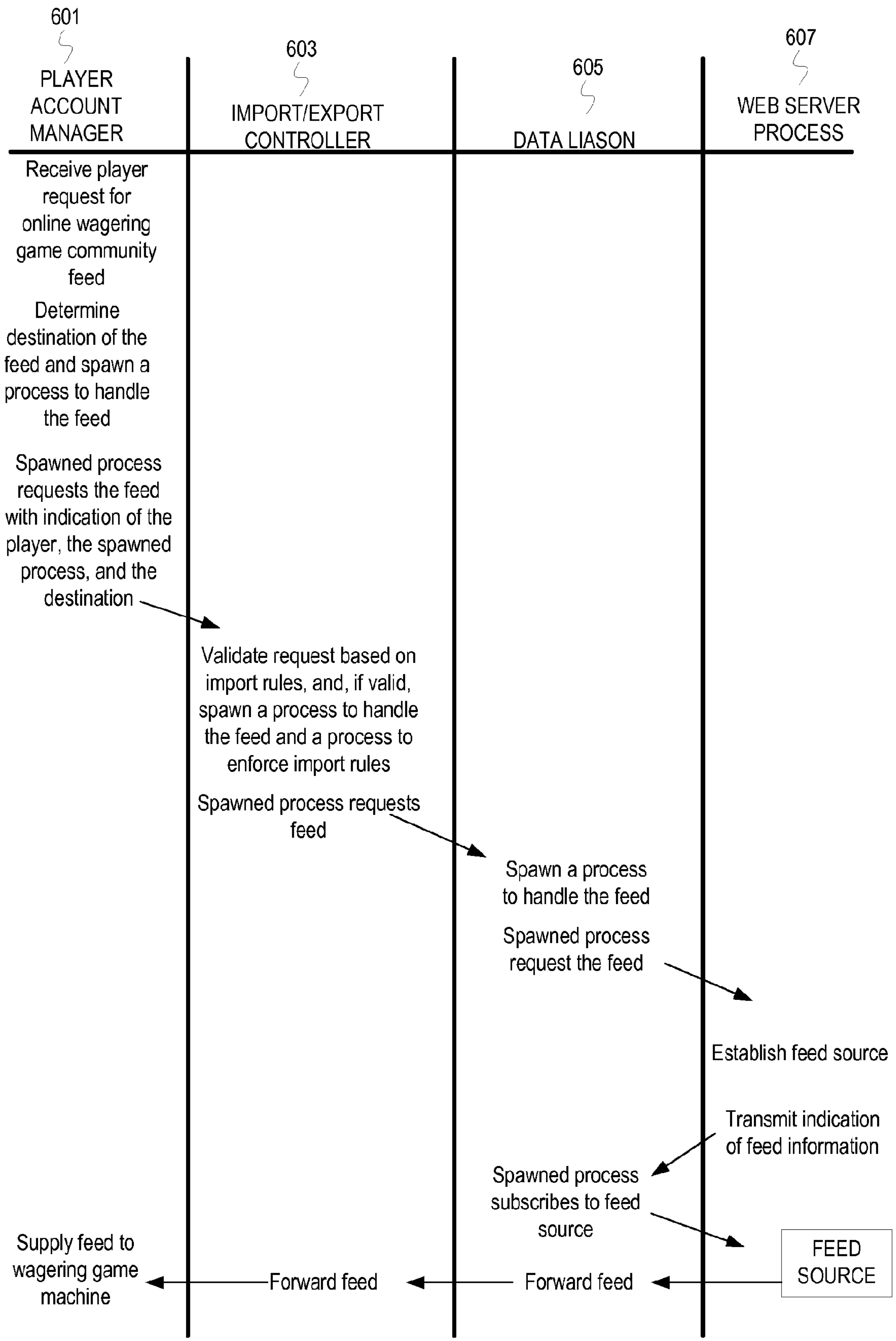
FIG. 6 depicts an example conceptual diagram of an import/export controller establishing an incoming data feed from an online social community.

Although FIGS. 3-4 depicts examples of discrete data transmissions, embodiments can secure data feeds and data streams between a highly regulated machine (e.g., a casino server) to a server of an online social community. FIGS. 5 and 6 depict examples of establishing data feeds between a wagering game establishment and an online social community. Although the examples refer to data feeds, embodiments are not limited to data feeds and can secure data streams.

FIG. 5 depicts an example conceptual diagram of an import/export controller establishing an outgoing data feed to an online social community. A web server process 507 of an online social community receives a request to view live wagering game establishment player data from an online friend of a player in a wagering game establishment. The web server process 507 requests a feed of the live wagering game establishment player data from a data liaison 505. The data liaison 505 determines a destination for the feed and spawns a process to handle the feed. The spawned process requests the feed from an import/export controller 501 of the wagering game establishment. The feed request includes an indication of the destination and/or requestor, the player, and the spawned process. The import/export controller 503 validates the feed request from the spawned process based on export rules for the wagering game establishment. For example, the rules may deny data feeds to particular requestors (e.g., those not registered with a game developer), limit feeds to a certain amount of bandwidth, limit feeds to certain times, etc. If the feed request is valid under the rules, then the import/export controller 503 spawns a process to handle the feed and a process to enforce export rules (e.g., sample packets of the feed to ensure compliance with the export rules), although it is not necessary for embodiments to spawn multiple processes. The process spawned by the import/export controller 503, requests a player account manager 501 for the feed of live wagering game establishment player data. The player account manager 501 establishes a source for the feed. The player account manager 501 transmits information about the source to the process spawned by the import/export controller 503. The spawned process of the import/export controller subscribes to the source established by the player account manager 501. Units of the data feed are forwarded from the process spawned by the import/export controller 503, across the data liaison 505, to the web server process 507. The web server process 507 forwards the units to the requestor.

FIG. 6 depicts an example conceptual diagram of an import/export controller establishing an incoming data feed from an online social community. A player account manager 601 of a wagering game establishment receives a player request for an online wagering game community data feed. For example, a player requests a communication session with an online friend while playing a wagering game. Feed requests can also be automated. For example, a wagering game can automatically request a data feed from an online wagering game community in response to a reading a player card of a user or based on configuration of a player account. The player account manager 601 determines a destination for requested feed, and spawns a process to handle the requested feed. The spawned process of the player account manager 601 requests the feed from an import/export controller 603 with an indication of the requesting player, the spawned process, and the destination. The import/export controller 603 validates the feed request from the spawned process based on import rules for the wagering game establishment. For example, the rules may deny data feeds from particular online social communities, may require certification for data feeds from online social communities, allocate bandwidth for data feeds differently dependent upon a corresponding wagering game or wagering game establishment tool, etc. If the feed request is valid under the rules, then the import/export controller 603 spawns a process to handle the feed and a process to enforce import rules, although it is not necessary for embodiments to spawn multiple processes. The process spawned by the import/export controller 603, requests a data liaison 605 for the feed from the online social community.

Outside of the wagering game establishment, the data liaison 605 and a web server process 607 of an online social community establish the data feed. The data liaison 605 receives the feed request from the process spawned by the import/export controller 603. The data liaison 605 spawns a process to handle the requested feed. The spawned process then requests the data feed of the web server process 607. The web server process 607 establishes a source for the feed. The web server process 607 transmits information about the source to the process spawned by the data liaison 605. The spawned process of the data liaison 605 subscribes to the source established by the web server process 607. Units of the data feed are forwarded from the process spawned by the data liaison 605, to the import/export controller 603, and then to the player account manager 601. The player account manager 601 supplies units of the data feed to the wagering game machine of the requesting player.

It should be understood that the illustrated examples are to aid in understanding embodiments, and should not be used to limit embodiments. For example, embodiments can transmit less information to establish a data feed, perhaps obviating transmission of the indication of the process, the requesting player, etc. In addition, embodiments are not limited to establishing feeds sourced from an online social community. For instance, embodiments can establish data feeds among multiple wagering games via an online social community. As an example, users of an online social community may want to compare winnings from wagering games while at different wagering game establishments. One or more data liaisons of the online social community can establish data feeds with the individual wagering game establishment, and then bridge the data feeds to allow the users to see each other's current status on a wagering game machine. Furthermore, data transmissions are not all required to traverse a database and a data liaison. An import/export can allow data transmissions from an electronic wagering game machine to an outside trusted destination through the import/export controller while avoiding the data liaison in accordance with export rules enforced by the import/export controller (e.g., reports at certain times of day to a game developer). The import/export controller can also allow an outside source to mine data from a wagering game establishment (virtual or physical) database in accordance with import/export rules. Likewise, the import/export controller can allow a wagering game establishment entity (e.g., process) to mine data from an online social network database in accordance with import/export rules.

In addition, the diagrams have been described with details to aid in understanding the inventive subject matter. These illustrative details, however, should not be used to limit embodiments or scope of the claims. A few of the illustrative details include exporting/importing player data and exporting/importing data with a wagering game establishment. Embodiments can regulate export/import of data that can arguably be classified outside of player data, and can be applied to a virtual casino.

The examples refer many times to player data. Although player data encompasses a wide spectrum of data about a player (e.g., player reputation, player winnings, favorite casinos, most frequently played wagering games, player avatar, player created images, etc.), embodiments can import/export data about or created by users who are not players. A user may contribute images popular among players even though the user is not labeled a player. A third party service may automatically generate audio, images, or video that is exported/imported into a wagering game establishment (physical or virtual). In addition, ratings of wagering games can be imported into or exported from a physical or virtual wagering game establishment. For example, players can rate wagering games, and the ratings provided by the players are weighted based on information about the player. A system can more heavily weigh ratings of wagering games by a player who frequently participates in an online social community and who visits both a virtual and a physical wagering game establishment. The system can apply a lower weight, fractional weights, negative weight, etc., to wagering game ratings provided by a user who infrequently visits physical or virtual wagering game establishments, who has a low reputation, etc.

The example diagrams also refer to casinos and wagering game establishments. Embodiments are not limited, however, to physical (i.e., brick and mortar) casinos and wagering game establishments. An import/export controller and a data liaison can securely funnel data transmissions between a physical and a virtual wagering game establishment, between an online social community and a virtual wagering game establishment, between different virtual wagering game establishments, etc. For example, current winnings for an online player on a virtual wagering game machine in a virtual casino can be transmitted to widget used by a friend of the online player. As another example, user created images can be imported into a virtual casino from an online social community to periodically update virtual wagering game machines. One or more data liaisons can also coordinate data transmissions across multiple players across different physical and virtual wagering game establishments for various widgets and/or competitions (e.g., team wagering competitions across different geographic locations).

Wagering Game Networks

Figure 7:
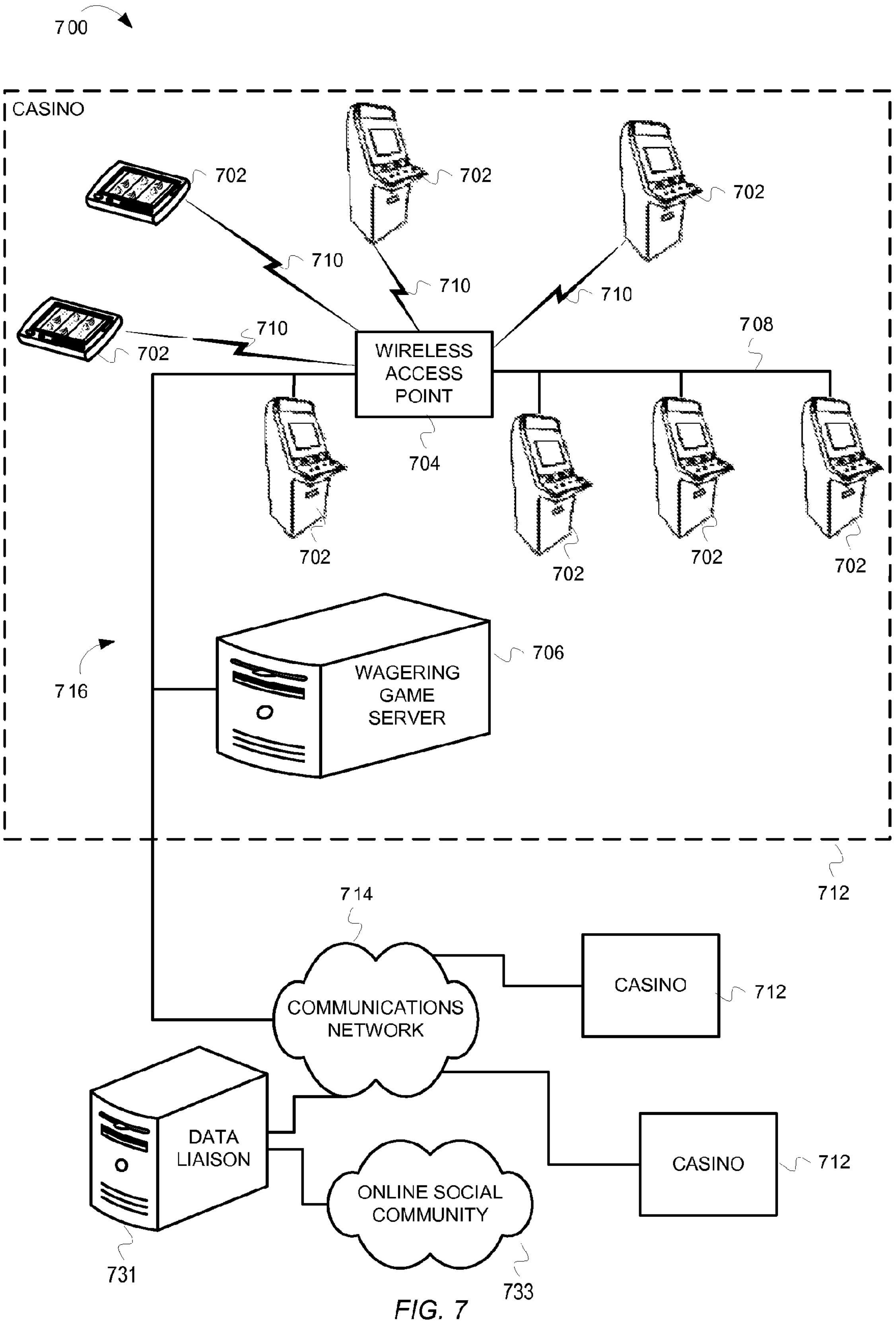
FIG. 7 is a block diagram illustrating a wagering game network 700, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714. In FIG. 7, the communications network 714 is also coupled with a data liaison 731. The data liaison 731 is coupled with an online social community network 733.

Each casino 712 includes a local area network 716, which includes an access point 704, a wagering game server 706, and wagering game machines 702. The access point 704 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). In addition, the wagering game server 706 can provide functionality of a data import/export controller. Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 8:
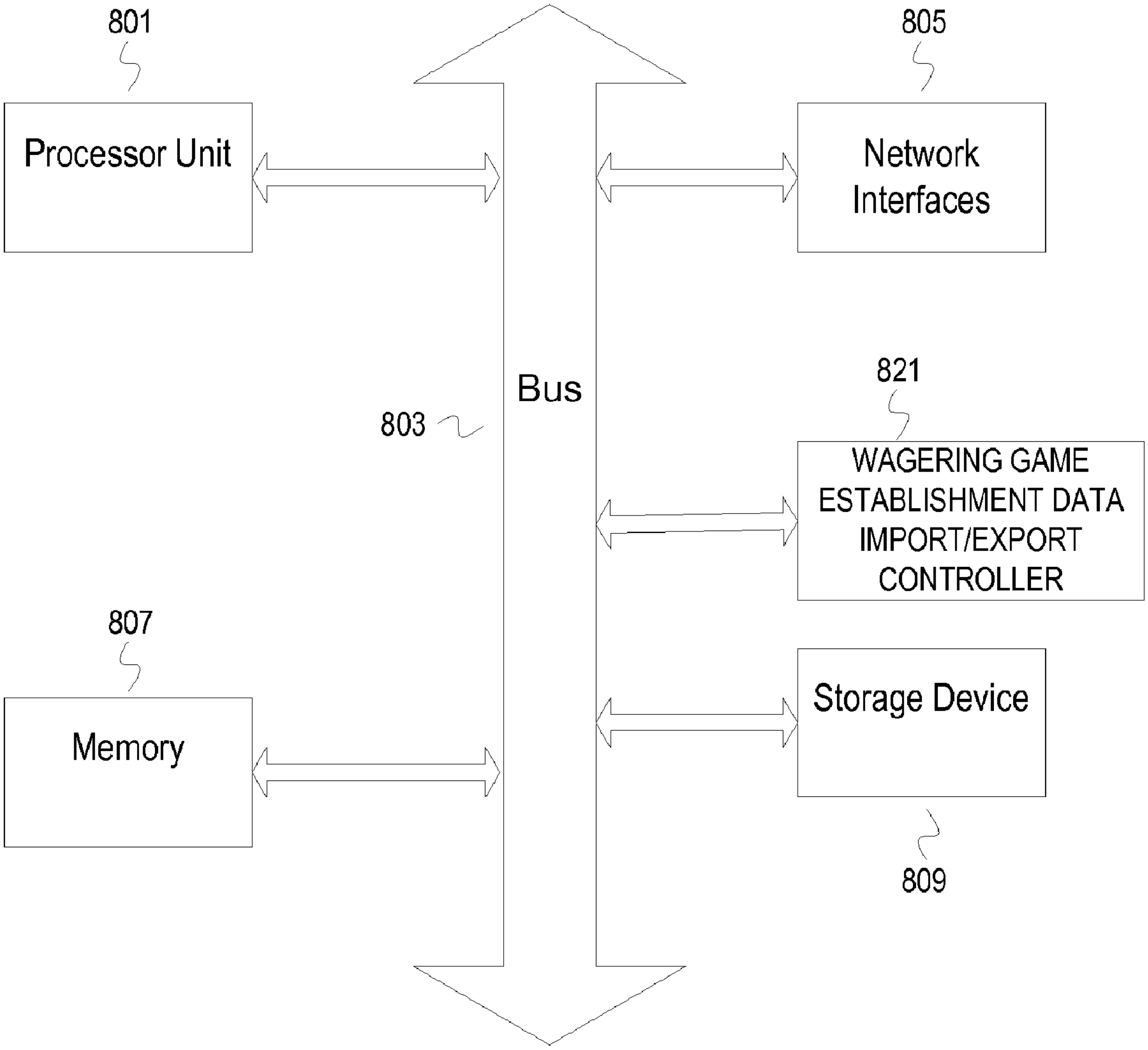
FIG. 8 depicts an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The computer system also includes a wagering game establishment import/export controller 821 regulates data transmissions between a wagering game establishment and an online social community based on rules of the wagering game establishment. Any one of the functionalities of the wagering game establishment import/export controller 821 may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of establishing a data feed from a data source on an online wagering game community server for a wagering game machine within a wagering game establishment, the method comprising:

evaluating a request for the data feed against import rules that regulate data imported into the wagering game establishment, wherein the request originates from the machine within the wagering game establishment;

determining that the data source and the request are valid based, at least in part, on said evaluating the request for the data feed against the import rules;

forwarding the validated request to a first machine operating as a data liaison external to the wagering game establishment, wherein the data liaison subscribes to the data source for the data feed based, at least in part, on the validated request;

a data import/export controller ensuring that the data feed forwarded from the data liaison complies with the import rules to generate an import rules compliant data feed, wherein the data liaison forwarded the data feed to a second machine operating as the data import/export controller within the wagering game establishment; and supplying the import rules compliant data feed to the wagering game machine in the wagering game establishment.

2. The method of claim 1 further comprising the data import/export controller and the data liaison agreeing upon a communication protocol and a security protocol in advance.

3. The method of claim 1, wherein said supplying the import rules compliant data feed to the wagering game machine in the wagering game establishment comprises:

the data import/export controller forwarding the import rules compliant data feed to a player account server, wherein the data feed comprises online wagering game community of a player represented by a player account managed by the player account server; and the player account server forwarding the import rules compliant data feed to the wagering game machine, wherein the player account indicates the player as logged into the wagering game machine.

4. The method of claim 3 further comprising at least one of trading an achievement represented by the import rules compliant data feed for a service within the wagering game establishment, exchanging online wagering game community credit represented by the import rules compliant data feed for credit within the wagering game establishment, enhancing a wagering game presented by the wagering game machine with the import rules compliant data feed, presenting a secondary game represented by the import rules compliant data feed, and displaying the import rules compliant data feed.

5. The method of claim 1, wherein the data import/export controller ensuring that the data feed forwarded from the data liaison complies with the import rules to generate the import rules compliant data feed comprises at least one of determining that the data feed corresponds to a player registered with a developer of the wagering game machine, limiting the data feed to a bandwidth specified by the import rules, expurgating data of the data feed that does not comport with a data format specified by the import rules, selecting particular fields from the data feed that can be imported, limiting the data feed to a size specified by the import rules, and limiting the data feed to an amount of time specified by the import rules.

6. A method of establishing a data feed from a data source on a first server within a wagering game establishment to a first machine external to the wagering game establishment via a data liaison and a second server of an online wagering game community, the method comprising:

evaluating a request for the data feed against export rules that regulate data exported from the wagering game establishment, wherein the request originates from the first machine external to the wagering game establishment and the request indicates the online wagering game community;

determining that the data feed to the first machine is permitted based, at least in part, on said evaluating the request for the data feed against the export rules;

a data import/export controller subscribing to the data source for the data feed, wherein the data import/export controller is within the wagering game establishment;

the data import/export controller receiving the data feed;

the data import/export controller applying the export rules to the data feed to generate an export rules compliant data feed; and the data import/export controller forwarding the export rules compliant data feed to a second machine operating as the data liaison, wherein the second machine operating as the data liaison is external to the wagering game establishment and forwards the export rules compliant data feed to the second server.

7. The method of claim 6, wherein the data source comprises at least one of a player account and wagering gaming data from a wagering game machine.

8. The method of claim 6, wherein the data import/export controller applying the export rules to the data feed to generate the export rules compliant data feed comprises expurgating units of the data feed in accordance with the export rules.

9. The method of claim 8, wherein said expurgating the units of the data feed in accordance with the export rules comprises one of removing and scrambling one of a player identifier used by the wagering game establishment and notes about a player maintained by the wagering game establishment.

10. The method of claim 6, wherein the data import/export controller applying the export rules to the data feed to generate the export rules compliant data feed comprises applying different levels of encryption for different aspects of player data indicated by the data feed.

11. The method of claim 6, wherein the data import/export controller applying the export rules to the data feed to generate the export rules compliant data feed comprises locating a first indication of the data liaison and a second indication of the online wagering game community in a hierarchical data structure of data liaison indications and online wagering game community indications, wherein positions of the first indication and the second indication correspond to security measures specified by the export rules.

12. A non-transitory machine-readable storage medium having program instructions for establishing a data feed from a data source on an online wagering game community server for a wagering game machine within a wagering game establishment, the program instructions comprising:

program instructions to evaluate a request for the data feed against import rules that regulate data imported into the wagering game establishment, wherein the request originates from the machine within the wagering game establishment;

program instructions to determine that the data source and the request are valid based, at least in part, on evaluation of the request for the data feed against the import rules;

program instructions to forward the validated request to a first machine operating as a data liaison external to the wagering game establishment, wherein the data liaison subscribes to the data source for the data feed based, at least in part, on the validated request;

program instructions to ensure that the data feed forwarded from the data liaison complies with the import rules to generate an import rules compliant data feed, wherein the data liaison forwarded the data feed to a second machine operating as the data import/export controller within the wagering game establishment; and program instructions to supply the import rules compliant data feed to the wagering game machine in the wagering game establishment.

13. The non-transitory machine-readable storage medium of claim 12, wherein the program instructions further comprise program instructions to agree upon a communication protocol and a security protocol with the data liaison.

14. The non-transitory machine-readable storage medium of claim 12, wherein the program instructions to supply the import rules compliant data feed to the wagering game machine in the wagering game establishment comprises the program instructions to:

forward the import rules compliant data feed to a player account server, wherein the data feed comprises online wagering game community data of a player represented by a player account managed by the player account server.

15. The non-transitory machine-readable storage medium of claim 14, wherein the program instructions further comprising program instructions to, at least one of, trade an achievement represented by the import rules compliant data feed for a service within the wagering game establishment, exchange online wagering game community credit represented by the import rules compliant data feed for credit within the wagering game establishment, enhance a wagering game presented by the wagering game machine with the import rules compliant data feed, present a secondary game represented by the import rules compliant data feed, and display the import rules compliant data feed.

16. The non-transitory machine-readable storage medium of claim 12, wherein the program instructions to ensure that the data feed forwarded from the data liaison complies with the import rules to generate the import rules compliant data feed comprises the program instructions to, at least one of, determine that the data feed corresponds to a player registered with a developer of the wagering game machine, limit the data feed to a bandwidth specified by the import rules, expurgate data of the data feed that does not comport with a data format specified by the import rules, select particular fields from the data feed that can be imported, limit the data feed to a size specified by the import rules, and limit the data feed to an amount of time specified by the import rules.

17. A non-transitory machine-readable storage medium having program instructions for establishing a data feed from a data source on a first server within a wagering game establishment to a first machine external to the wagering game establishment via a data liaison and a second server of an online wagering game community, the program instructions comprising:

program instructions to evaluate a request for the data feed against export rules that regulate data exported from the wagering game establishment, wherein the request originates from the first machine external to the wagering game establishment and the request indicates the online wagering game community;

program instructions to determine that the data feed to the first machine is permitted based, at least in part, on evaluation of the request for the data feed against the export rules;

program instructions to subscribe to the data source for the data feed;

program instructions to receive the data feed;

program instructions to apply the export rules to the data feed to generate an export rules compliant data feed; and program instructions to forward the export rules compliant data feed to a second machine operating as the data liaison, wherein the second machine operating as the data liaison is external to the wagering game establishment and forwards the export rules compliant data feed to the second server.

18. The non-transitory machine-readable storage medium of claim 17, wherein the data source comprises at least one of a player account and wagering gaming data from a wagering game machine.

19. The non-transitory machine-readable storage medium of claim 17, wherein the program instructions to apply the export rules to the data feed to generate the export rules compliant data feed comprises the program instructions to expurgate units of the data feed in accordance with the export rules.

20. The non-transitory machine-readable storage medium of claim 19, wherein the program instructions to expurgate units of the data feed in accordance with the export rules comprises the program instructions to, one of, remove and scramble one of a player identifier used by the wagering game establishment and notes about a player maintained by the wagering game establishment.

21. The non-transitory machine-readable storage medium of claim 17, wherein the program instructions to apply the export rules to the data feed to generate the export rules compliant data feed comprises the program instructions to apply different levels of encryption for different aspects of player data indicated by the data feed.

22. The non-transitory machine-readable storage medium of claim 17, wherein the program instructions to apply the export rules to the data feed to generate the export rules compliant data feed comprises the program instructions to locate a first indication of the data liaison and a second indication of the online wagering game community in a hierarchical data structure of data liaison indications and online wagering game community indications, wherein positions of the first indication and the second indication correspond to security measures specified by the export rules.

23. An apparatus comprising:

a processor;

a network interface operable to receive a request for a data feed, wherein the request originates from a first machine accessing an online community that is external to and separate from a network of a wagering game establishment;

means for establishing the data feed between a data source in the network and a data import/export controller in the network;

means for enforcing export rules on the data feed received at the import/export controller to generate an export rules compliant data feed; and means for forwarding the export rules compliant data feed to a second machine operating as a data liaison between the wagering game establishment and the online community, wherein the second machine forwards the export rules compliant data feed to a server of the online community.

24. The apparatus of claim 23, wherein the data source comprises at least one of a player account and wagering gaming data from a wagering game machine.

* * * * *